United States Patent [19]
Hill

[11] Patent Number: 5,234,128
[45] Date of Patent: Aug. 10, 1993

[54] AGGREGATE MATERIAL SPREADER

[76] Inventor: Francis K. Hill, P.O. Box 2059, Wickenburg, Ariz. 85358

[21] Appl. No.: 699,980

[22] Filed: May 13, 1991

[51] Int. Cl.[5] .............................................. B67D 5/08
[52] U.S. Cl. ........................................ 222/63; 222/52; 222/612; 222/613; 222/556; 239/650; 239/155; 404/110
[58] Field of Search ....................... 239/155, 650, 659; 222/52, 63, 502–505, 556, 608, 611.1, 612–617; 404/101, 109, 110, 111

[56] References Cited

U.S. PATENT DOCUMENTS

| | | | |
|---|---|---|---|
| 2,850,216 | 9/1958 | Webster | 239/650 |
| 2,953,977 | 9/1960 | Warren | 404/110 |
| 3,029,714 | 4/1962 | Creswell | 404/110 |
| 3,519,169 | 7/1970 | Holland | 222/504 X |
| 3,677,540 | 7/1972 | Weiss | 222/63 X |
| 3,679,098 | 7/1972 | Weiss | 222/63 X |
| 3,877,645 | 4/1975 | Oligschlaeger | 239/155 |
| 4,350,293 | 9/1982 | Lestradet | 222/63 X |
| 4,523,280 | 6/1985 | Bachman | 222/613 X |
| 4,676,690 | 6/1987 | Allen | 222/556 X |
| 4,705,125 | 11/1987 | Yamada et al. | 222/556 X |

FOREIGN PATENT DOCUMENTS 2163631  3/1986  United Kingdom ............... 239/650

Primary Examiner—Kevin P. Shaver
Attorney, Agent, or Firm—David G. Rosenbaum

[57] ABSTRACT

A material spreader consisting of a hopper, attached to a motor vehicle, which receives and dispenses an aggregate material in predetermined quantities and in a layer having substantial uniformity in thickness. The rate of dispensing the aggregate material is controlled by a computer which receives the desired weight of aggregate per area data input from the operator, senses the velocity of the motor vehicle, and adjusts the release rate of the aggregate from the hopper. The hopper is laterally expansible to accommodate varying road widths, and dispenses the aggregate material through gate openings in the bottom of the hopper. The aggregate is dispensed from the hopper without the aid of any operational parts exposed to the aggregate material within the interior area of the hopper.

20 Claims, 2 Drawing Sheets

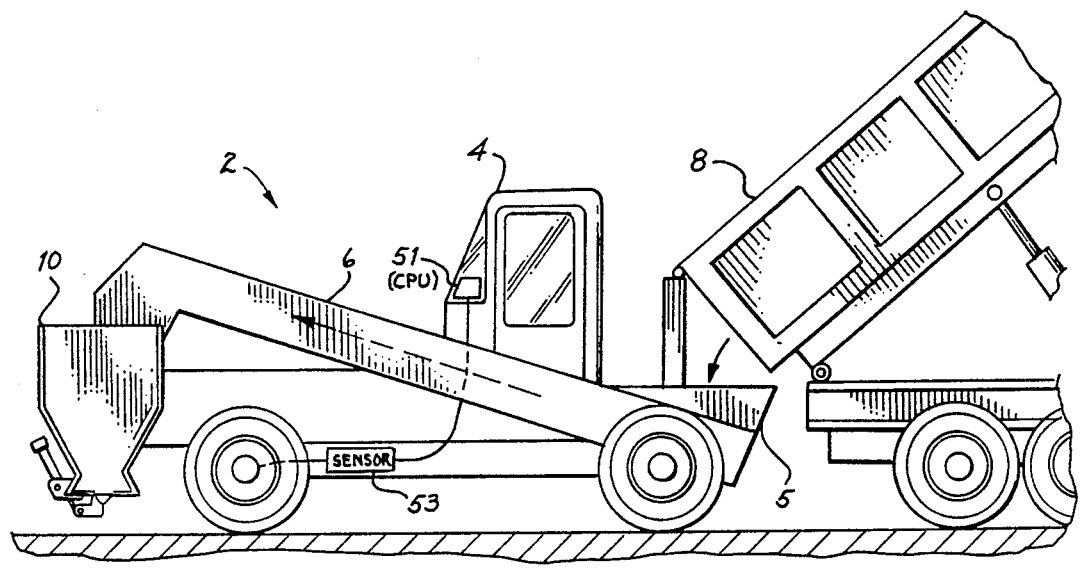
Fig. 1
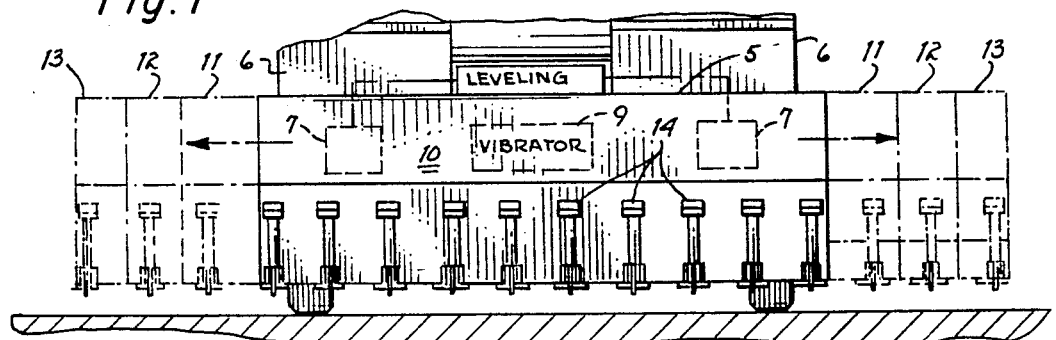
Fig. 2
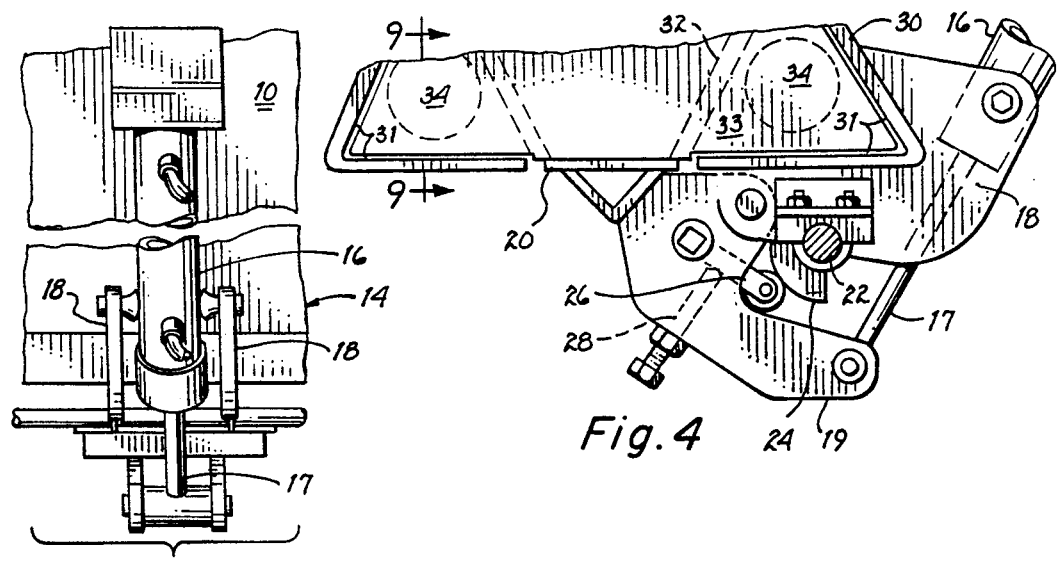
Fig. 3
Fig. 4

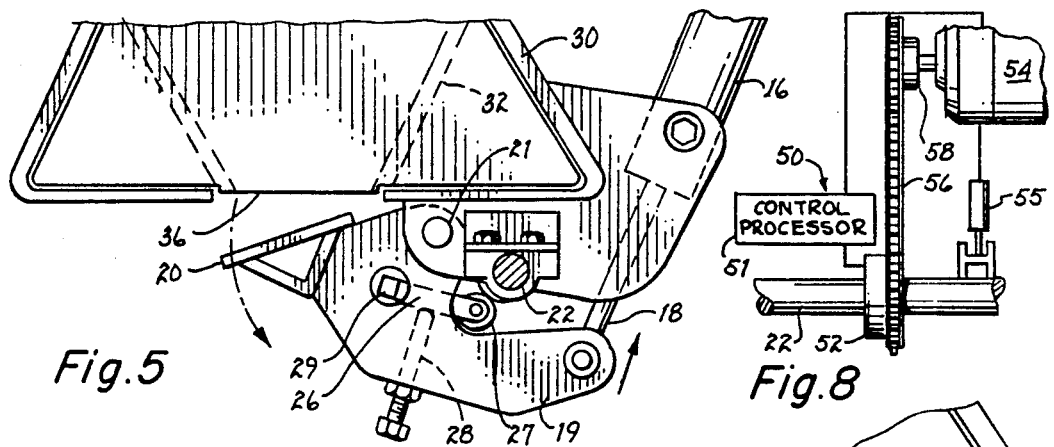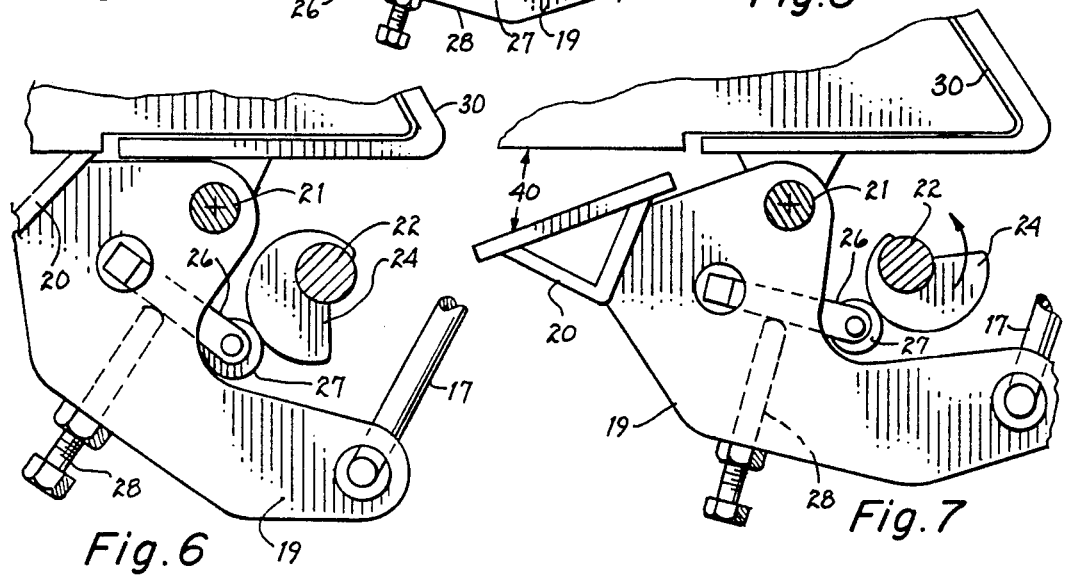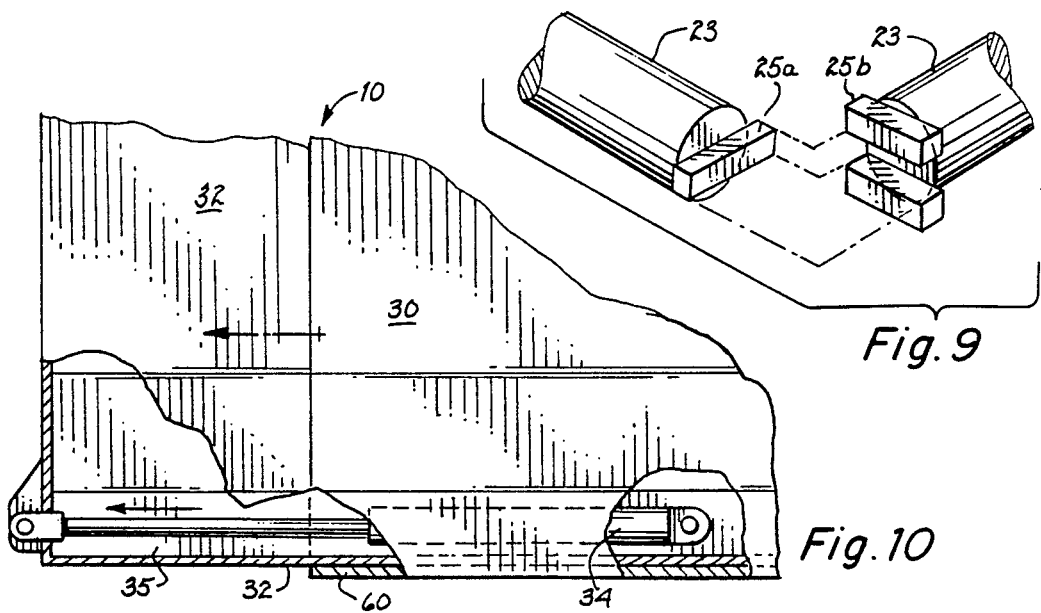

AGGREGATE MATERIAL SPREADER

BACKGROUND OF THE INVENTION

The present invention relates generally to an apparatus for dispensing a substantially uniform layer of an aggregate material onto a roadway surface. More particularly, the present invention relates to an aggregate spreader having a hopper, attached to a motor vehicle, which receives an aggregate material from an aggregate source and dispenses predetermined quantities of the aggregate material in a layer having a substantially uniform thickness.

A widely used, economical method for building and/or repairing roadways is commonly known as "chip sealing." The chip sealing process entails the deposition of a layer of asphalt or oil onto the roadway bed, after which an aggregate mix is deposited onto the asphalt or oil layer and the aggregate is rolled to seat the aggregate into the asphalt or oil layer. Contractors will typically over deposit the aggregate to assure adequate binding of the aggregate into the asphalt to form the overlayer for the roadway. Such practices, however, invariably result in loose aggregate on the roadway being thrown up by vehicles traveling on the roadway which causes property damage to following vehicles, traffic accidents and possibly injury. Moreover, the practices of over depositing of aggregate are wasteful and non-economical.

To achieve a uniform spread of aggregate material it is necessary to achieve uniform deposition of the aggregate material across the spread width and along the entire length of the spread path. Most of the conventional spreaders have focused only on the problem of deposition uniformity across the spread width and have left the problem of uniformity along the length of the spread path to the vagaries of manual control.

A variety of such material spreading and/or dispensing systems have been devised by those skilled in the art. Illustrative of such conventional material spreading and/or dispensing systems are the following:

A. U.S. Pat. No 1,200,274 entitled "HOISTING BUCKET" to Thomas on Feb. 3, 1916, discloses a hoisting bucket having two bottom doors which are actuated by a trip lever to unload the contents of the hoisting bucket.

B. U.S. Pat. No. 1,880,287 entitled "ASPHALT MIXER" issued to Sifton on Oct. 4, 1932, discloses an asphalt mixer having a bottom oscillating panel which feeds asphalt from the lower opening of the hopper onto a conveyor. The oscillating plate is under control of a rotary piston arrangement which serves to laterally displace the bottom plate.

C. U.S. Pat. No. 3,054,160, entitled "SHUTTLE CARS," issued to Le Tourneau on Sept. 18, 1962, discloses a self-propelled load hauling and self-dumping shuttle car such as that used in a mine. This patent discloses a pivoting gate which opens and closes through a pinion gear, and is illustrative of a pivoting gate arrangement.

D. U.S. Pat. No. 2,663,439, entitled "TELESCOPIC DUMPING TRUCK", issued to Phelps on Dec. 22, 1953, discloses a telescoping dump truck which has an expansible/retractable enclosure for carrying as well as dispensing. The telescoping dump truck consists of a series of hydraulically driven plates, each of which are slidably engaged with an interior surface of an outlying plate. This patent provides an example of an hydraulically actuated expansible enclosure.

E. U.S. Pat. No. 4,023,719, entitled "HOPPER CLOSING AND EMPTYING DEVICE," issued to Noyon on May 17, 1977, discloses a pivoting hopper gate wherein the gate is located in the vicinity of a third corner of a triangular linkage and an actuating lever is provided for opening of the gate. The door of the gate swings free of the bottom of the hopper to allow the material to be dispensed.

F. U.S. Pat. No. 4,484,852, entitled "HOPPER BOTTOM UNIT," issued to Anderson on Nov. 27, 1984, discloses a vibrating hopper bottom unit which facilitates discharge of a material from the bottom of the hopper. The unit consists mainly of a flexible membrane which is oscillated by a vibrator mounted on a beam attached to the vibrating membrane. The vibrator 160 includes a motor which oscillates the vibration beam attached to the membrane.

G. U.S. Pat. No. 4,697,951, entitled "MATERIAL SPREADER SYSTEM" issued to Allen on October 6, 1987, discloses a spreader which stores a supply of a material for dispensing a layer of the material as the spreader is transported along a defined path. With particular reference to FIGS. 6A and 6B of this patent, a gate is provided which consists of clamp shell doors. A linkage which actuates clamp shell doors is provided. The linkage attached to the gates may include an actuator arm which is, in turn, attached to a pneumatic cylinder. A series of pneumatic air vibrators are coupled to the hopper which contains the material to be dispensed. The air vibrators commence operation when the actuator is operated to open the gate. The vibrations produced by the air vibrators cause the hopper surfaces to vibrate, thereby causing the material within the hopper to be uniformly metered through the gate.

H. The Flaherty SPK-H Chip Spreader manufactured by Seaman Company of Milwaukee, Wis. provides a fixed width spreading hopper which has an interior spread roll and agitator bar within the hopper. Cutoff gates are provided to allow for variable spread widths. Radial-type gates are remotely controlled from the operator's deck and open in one-sixteenth increments from 0 to 4.5 inches. The gate openings are established and set manually. The gates are forward mounted and aggregate passing through the hopper is laterally distributed by the interior spread roll and agitator bar.

I. E. D. Entyre & Co. of Oregon, Ill. manufactures mechanical and hydrostatic self-propelled chip spreaders, which both employ a fixed width hopper. The hopper is fitted with a hydraulically driven agitator and spread roll, which are actuated by gate opening. The spread gates are forward mounted, and have individual shut-off controls. Gate openings are established and set manually via a dial on the instrument panel.

J. E. D. Entyre & Co. also manufactures a variable width spreading hopper, consisting of two independent spread hoppers which are independently operated and fed with aggregate. Each spread hopper has a spread roller which turn in opposite directions. The remaining operational features are identical to the Entyre spreader noted in item "I" above.

Those skilled in the art will appreciate that the abovedescribed material spreaders and dispensers fail to provide adequate uniformity of material spreading and lack automated controls which facilitate uniformity of material spreading under various roadway conditions.

SUMMARY OF THE INVENTION

In accordance with the present invention, and as will hereinafter be described with reference to the preferred embodiments of the invention illustrated in the accompanying figures, the invention consists generally of a hopper, attached to a motor vehicle, which receives and dispenses an aggregate material in pre-determined quantities and in a layer having substantial uniformity in thickness. The rate of dispensing the aggregate material is controlled by a computer, which receives the desired weight of aggregate per area data input from the operator, senses the velocity of the motor vehicle, and adjusts the release rate of the aggregate from the hopper.

The hopper is laterally expansible to accommodate varying road widths, and dispenses the aggregate material through a gate opening in the bottom of the hopper. The aggregate is dispensed from the hopper without the aid of any operational parts exposed to the aggregate material within the interior area of the hopper. By providing the gate opening at the bottom of the hopper, gravity causes the aggregate flows through the hopper without the aid of screws, paddles or other similar mechanisms to facilitate moving the aggregate out from the interior of the hopper. This configuration readily lends itself to wider gate openings than are possible with the conventional spreaders, which results in the present invention being capable of higher deposition rates and minimal obstructions in the hopper.

The hopper is fitted with a plurality of gates attached to the hopper in a linear array. Each gate has a gate plate maintained in a closed configuration by an associated pneumatic piston cylinder which exerts a positive pressure on the gate plate. A common cam shaft extends longitudinally along the entire linear array of gates, with each gate having a cam associated with the gate. A cam follower associated with the gate plate is activated by rotation of the cam and exerts an opposing pressure on the gate plate to counteract the pressure exerted by the pneumatic piston cylinder and open the gate. The cams have a synchronous throw, which results in all gates having a uniform width opening dependent only upon the degree of rotation of the cam shaft.

A drive mechanism is coupled to the cam shaft and to the computer controller. The computer controller will sense the rotational position of the cam shaft, and continuously adjust the rotational position of the cam shaft, and hence the gate openings, as a function of vehicle velocity.

The laterally expansible hopper may be incrementally expanded and contracted. Discrete gate units are provided which are installed onto and are removable from the expanded portions of the hopper. Each of the discrete gate units are provided with a cam shaft unit, having coupling fittings to join the cam shaft unit with the common cam shaft linking the linear array of gates on the non-expansible portion of the hopper.

Those skilled in the art will understand from the foregoing summary of the invention, and from the following more detailed description of the preferred embodiments of the invention, that the present invention represents a significant improvement over the conventional aggregate spreader. Specifically, the invention facilitates greater operational speeds, which results in faster aggregate deposition rates with greater uniformity in the deposited aggregate layer. Because of this higher level of control, it has been found that over ninety-nine percent of the excess aggregate, typically over deposited by the conventional aggregate spreaders, may be eliminated by the aggregate spreader of the present invention.

BRIEF DESCRIPTION OF THE FIGS.

FIG. 1 is an elevational view illustrating the general operation of the aggregate spreader of the invention.

FIG. 2 is a front elevational view of the hopper portion of the aggregate spreader of the present invention, illustrating expanded positions in phantom.

FIG. 3 is a front elevational view of a gate mechanism in accordance with the present invention.

FIG. 4 is a side elevational, partial cross-sectional, view of a gate mechanism in accordance with the present invention.

FIG. 5 is a side elevational, partial cross-sectional, view of a gate mechanism illustrating operation thereof.

FIG. 6 is a side elevational, partial cross-sectional, view of a gate mechanism illustrating the gate in a closed position.

FIG. 7 is a side elevational, partial cross-sectional, view of a gate mechanism illustrating the gate in an open position.

FIG. 8 is an elevational view of a drive mechanism for a common cam shaft in accordance with the present invention.

FIG. 9 is an exploded fragmentary view of a coupling fitting for a cam shaft unit on a gate unit in accordance with the present invention.

FIG. 10 is a side elevational, partial cross-sectional view taken along line 10—10 of FIG. 4.

DETAILED DESCRIPTION OF THE PREFERRED EMBODIMENTS

Turning now to the accompanying figures, and with particular reference to FIGS. 1 and 2, there is illustrated an aggregate material spreader 2 in accordance with the present invention. Aggregate material spreader 2 consists generally of a motorized vehicle 4, having a feed hopper 5 which receives an aggregate material from a supply vehicle 8, a conveyor system 6, which transports the aggregate material from the feed hopper 5, and a spread hopper 10 which receives the conveyed aggregate material from the conveyor system 6, and dispenses the aggregate material onto the roadway surface.

The spread hopper 10 is bi-laterally expandable, and may be expanded selected increments 11, 12 or 13, depending upon the spread width required for aggregate deposition. A plurality of gates 14 are associated with the hopper 10, and serve to control the deposition of the aggregate material from the hopper 10 onto the roadway surface. The gates 14 on the expanded hopper segments 11, 12 or 13 are removable to facilitate expansion and contraction of the hopper 10.

The interior hopper configuration consists generally of an upper opening which receives the aggregate material from the conveyor system 6, and an aggregate outlet 36 formed by an opening in the bottom of the hopper 10. Thus, there is a free unobstructed aggregate flow path through the hopper 10. Gates 14 close the aggregate outlet 36 and are the only means for regulating the release of aggregate from the hopper 10.

The configuration of the gates 14 is best illustrated with reference to FIGS. 3-7. Each gate 14 consists generally of a pressure cylinder 16, which may be a pneumatic or hydraulic piston cylinder, which is secured to the hopper 10 by a securing member 18. The pressure cylinder 16 has a reciprocating piston 17 which is coupled to a rocker arm 19. Rocker arm 19 is pivotally connected to the securing member 18. The rocker arm 19 is fitted with a gate plate 20 which engages with and closes the aggregate outlet 36.

A cam shaft 22 is coupled to the securing member 18, and extends the entire length of the linear array of gates 14. A plurality of cam members 24 are associated with the cam shaft 22, one cam member 24 being disposed along the cam shaft 22 at a position corresponding to each gate 14. The cam members 24 preferably have a travel of approximately 210° about 290° about the axis of the cam shaft 22 and ar synchronous.

A cam follower 26, having a cam roller 27, is pivotally connected to the rocker arm 19. An adjustable travel restriction member 28 is also coupled to the rocker arm 19 and communicates with the cam follower 26. The cam roller 27 is engaged upon the cam member 24, such that rotation of the cam member 24 transfers force to the cam roller 27 and cam follower 26. The cam follower 26 then impinges upon the travel restriction member 28, thereby conveying the transferred force to the rocker arm 19. The rotational force generated by the cam member 24 is, therefore, converted to a linear force vector acting upon the rocker arm 19. The linear force exerted on the rocker arm 19 overcomes the positive pressure exerted by the pressure cylinder 16 and induces pivoting of the rocker arm 19. When the rocker arm 19 pivots, the gate plate 20 disengages from the aggregate outlet 36, thereby opening the aggregate outlet 36 to permit an outflow of the aggregate material.

The adjustable travel restriction member 28 allows the operator to delimit gate opening 40 and set a desired maximum gate opening. Maximum gate opening is defined as the distance between the aggregate outlet 36 and the gate plate member 20. The gate opening 40 is, therefore, infinitely variable within the gate opening range of zero, or closed, to the maximum gate opening. Within this gate opening range, the gate opening 40 is dependent solely upon the rotational position of the common cam shaft 22 and the cam member 24 associated with a particular gate 14.

By configuring all of the plurality of cam members 24 to have a synchronous travel, and adjusting each gate 14 to identical maximum gate openings, there will be uniformity of gate openings along the linear array of gates 14. Thus, the rate of deposition of the aggregate material will be substantially uniform across the spread width of the hopper 10.

As illustrated in FIG. 8, the rotational force applied to common cam shaft 22 is provided by a drive mechanism 50. For illustrative purposes only, and not intended to be nor construed to limit the scope of the invention, the drive mechanism illustrated consists of a gear sprocket 52 and a drive sprocket 58, interconnected with a drive belt or chain 56. A drive motor 54 is provided and connected to the drive sprocket 58. Those skilled in the art will understand that any of a variety of drive mechanisms 50 may be employed such as are known in the art to rotate a cam shaft, such as, for example, a direct gear drive or a hydraulic drive. According to the best mode known for the invention, the drive motor 54 consists of a rotary encoder which senses the rotational position of the gear sprocket 52 and feeds such position back to the drive motor 54. Alternatively, the drive mechanism 50 may consist of a rotational sensor which reads the rotational position directly from the common cam shaft 22 and feeds such position back to the drive motor 54. Still further, a piston encoder 55 may be substituted for the rotary encoder.

The control processor 51 for the drive mechanism 50 consists, fundamentally, of a process link between the vehicle 4 and the gate opening 40 which achieves uniformity of aggregate material deposition along the entire length of the spread path. It is known that variations in the velocity of the vehicle 4 will alter volume of aggregate deposited per measured area. Thus, it is incumbent upon the operator to either maintain a uniform vehicle speed, which is very difficult due to the regular on-loading and off-loading of dump trucks containing the aggregate material, grade variations in the roadway, obstructions, etc., or to adjust the gate openings to account for variations in vehicle speed. The conventional aggregate spreaders relegate this task to the judgment of the operator and, therefore, fail to provide a reliable means for adjusting gate openings as a function of vehicle speed.

In the aggregate spreader of the present invention, the operator inputs the desired aggregate spread volume per measured area, e.g., 20 lbs aggregate/square yard, into the control processor. The sensor 53 in FIG. 1, such as that coupled to the vehicle drive train or transmission, e.g., a hall effect sensor coupled to the differential gear, senses the velocity of the vehicle and relays the velocity data, e.g., pulses, to the control processor 51. The control processor then compares the velocity of the vehicle to the spread volume data, calculates the difference, and signals the drive mechanism 50 to actuate rotation of cam shaft 22 to open or close the plurality of gates 14 to compensate for vehicle velocity variations. With the control processor 51, the gate openings are automatically and constantly updated and adjusted to compensate for the inevitable vehicle velocity variations encountered during a run. This feature permits faster deposition run than is achievable with the conventional spreaders.

For example, the Etnyre Hydrostatic ChipSpreader, noted above, lists a maximum deposition speed of 750 feet per minute (fpm) in its product brochure. Most other conventional spreaders have a maximum spread rate of about 600 fpm. The principal factors limiting the spread rate in conventional aggregate spreaders are obstructions in the hopper due to large or oversized aggregate pieces, and the need for manual adjustment of the gate openings to accommodate for vehicle velocity variances. Principally due to the lack of internal moving parts within the hopper 10 of the invention, and because gate openings are constantly and automatically adjusted, the aggregate spreader of the present invention has achieved a maximum spread rate of about 2,000 fpm in test runs.

The control processor 51 consists principally of a CMOS microprocessor which is programmed with data reflecting a speed/aggregate distribution curve. The speed/aggregate distribution curve data may be developed by test running the vehicle at set speeds and set gate openings, and measuring the average aggregate distributed over a fixed area, e.g., pounds/square yard. This data is then assembled and input into the microprocessor as the speed/aggregate distribution curve. The vehicle speed sensor coupled to the vehicle reads the velocity of the vehicle and relays the velocity information to the microprocessor. Within the microprocessor, the set aggregate distribution figure, input by the operator, is compared with the sensed velocity, and the gate openings are adjusted in accordance with the predetermined speed/aggregate distribution curve.

As illustrated in FIGS. 2 and 10, the width of hopper 10 is adjustable. Inner hopper wall 32 is mounted in slidable relationship to outer hopper wall 30. Lateral movement of inner hopper wall 32 is preferably actuated by hydraulic cylinders 34 which are coupled, at one end thereof to the stationary outer hopper wall 30, and at a second end thereof to the inner hopper wall. Those skilled in the art will understand, however, that a variety of actuator mechanisms, such as are known in the art, i.e., pneumatics, gear drives, screw drives, or rack and pinion, may be employed to facilitate lateral movement of the inner hopper wall 32 relative to the outer hopper wall 30. The actuators may be manually, mechanically or electrically actuatable as is well known in the art.

In accordance with the best mode contemplated for the invention, the inner hopper wall 32 is configured having inverted substantially tetrahedral cross-sectional shape. The bottom aspect of the inner hopper wall 32 having a triangular-shaped channel 33 associated therewith, into which the hydraulic cylinder 34 is operably disposed. The outer hopper wall 30 is also configured having an inverted substantially tetrahedral cross-sectional shape. A bottom aspect of the outer hopper wall 30 being defined by an angled flange portion 31 forming an expansion channel which slidably receives the triangular shaped channel 33, formed by the bottom aspect of the inner hopper wall 32. There are provided symmetrical frontal and rearward expansion channels and triangular-shaped channels 33. At least one expansion cylinder 34, such as a hydraulic or pneumatic cylinder, is fixed within each of the expansion channel, at a first end thereof, and in the triangular-shaped channel 33, and a second end thereof. Activating the expansion cylinder 34 causes expansion or contraction of the inner hopper wall relative to the outer hopper wall.

In its expanded condition, hopper 10 may be fitted with removable gates 14. With reference to FIG. 9, there is illustrated extension cam shafts 23 and associated cam shaft joining members 25a and 25b. Each of the extension gates 14 (not illustrated) have an associated extension cam shaft 23 to control gate opening. To facilitate common control, extension gates 14, fitted onto the expanded portion of hopper 10, are commonly joined, in end-to-end fashion through the extension cam shafts 23 and joining members 25a and 25b. In accordance with the best mode contemplated for the invention, joining members 25a and 25b consist of male and female couplings, respectively, and consist of bayonet-type fittings coupled to the ends of each of the extension cam shafts 23.

Finally, according to the best mode contemplated for the invention there is provided a discrete hopper leveling system 5 in FIG. 1. It is known that uphill or downhill roadway grades affect the rate of deposition of the aggregate material due to gravitational forces acting on the relatively fluid aggregate material inside the hopper. The present invention provides a discrete hopper leveling system which maintains the position of the hopper relative to gravity to ensure a substantially uniform aggregate deposition along the deposition run. The hopper 10 is pivotally mounted onto the vehicle frame. Pneumatic or hydraulic leveling cylinders 7 are coupled to the hopper and to the vehicle frame and control both forward-rearward tilting adjustment and lateral attitude adjustment for the hopper. The leveling cylinders 7 are coupled to mercury switches associated with the hopper, which sense the level of the hopper relative to the ambient gravitation vector and feed back the level information to a controller for the leveling cylinders 7. The leveling cylinders are activated to adjust the leveling of the hopper relative to the ambient gravitational vector.

Finally, there is provided a vibrator 9 in FIG. 2, operably coupled to the hopper 10. Vibrator 9 oscillates and imparts a vibratory motion to the hopper 10 to uniformly distribute the aggregate within the hopper in the manner taught by U.S. Pat. No. 4,697,951, entitled "MATERIAL SPREADER SYSTEM" issued to Allen on Oct. 6, 1987.

It has been found that the above-described aggregate distribution system allows an operator to substantially uniformly deposit aggregate at operational rates of up to 2,000 feet per minute and in deposition volumes of up to 50 lbs/yd$^2$ ±1 lb. Those skilled in the art will appreciate that this represents a significant advance over known aggregate spreaders.

While the invention has been disclosed and described with reference to the preferred embodiments thereof, those skilled in the art will understand and appreciate that variations and substitutions in materials, components or circuits may be made within the scope and spirit of the invention, which is intended to be limited only by the claims appended hereto.

What is claimed is:

1. In combination with a motor vehicle, an aggregate spreading apparatus for receiving and dispensing a loose aggregate material in a substantially uniform layer, said aggregate spreading apparatus comprising:
   (a) an expandable hopper having an inner hopper sleeve and an outer hopper sleeve, said inner hopper sleeve being disposed in slidable engagement with said outer hopper sleeve, an upper inlet opening and a lower discharge opening;
   (b) expansion means for moving said inner hopper sleeve laterally with respect to said outer hopper sleeve;
   (c) dispensing means for dispensing aggregate material, said dispensing means comprising:
      (i) a plurality of gates coupled to said expandable hopper, each of said plurality of gates being operably associated with said lower discharge opening of said expandable hopper;
      (ii) gate actuating means for providing common control of the opening and closing of said plurality of gates;
   (d) drive means for driving said gate actuating means; and
   (e) control means operably coupled to said drive means and to said motor vehicle for sensing a speed of the motor vehicle, controlling said drive means, thereby actuating said gate actuating means to commonly control the opening and closing of said plurality of gates.

2. The aggregate spreading apparatus according to claim 1, wherein said expansion means further comprises:
   (a) a forward chamber member forming at least one of a plurality of forward chamber ducts wherein said forward chamber is attached to said hopper near said lower opening;
   (b) a rearward chamber member forming at least one of a plurality of rearward chamber ducts wherein said rearward chamber is attached to said hopper near said lower opening;

(c) a second actuating means for transmission of a force to laterally reciprocate said inner hopper, wherein said second actuating means is disposed within said at least one of a plurality of forward chamber ducts and interconnects said external hopper sleeve to said inner hopper sleeve; and (d) a third actuating means for laterally reciprocating said inner hopper, wherein said third actuating means is disposed within said at least one of a plurality of rearward chamber ducts and interconnects said external hopper sleeve to said inner hopper sleeve.

3. The aggregate spreading apparatus according to claim 2, wherein said forward chamber member and said rearward chamber member are triangular-shaped.

4. The aggregate spreading apparatus according to claim 2, wherein said second actuating means and said third actuating means are manually actuatable.

5. The aggregate spreading apparatus according to claim 2, wherein said second actuating means and said third actuating means are hydraulically operable actuators.

6. The aggregate spreading apparatus according to claim 1, wherein each of said plurality of gates further comprises:

(a) a base plate for removably coupling said gate to said expandable hopper;

(b) an arm member pivotally coupled to said base plate;

(c) a gate plate member coupled to said arm member forming a closure for at least a portion of said lower discharge opening of said expandable hopper; and (d) follower means for transferring force from said gate actuating means to said arm member.

7. The aggregate spreading apparatus according to claim 6, wherein said gate actuating means further comprises a cam shaft common to each of said plurality of gates, said cam shaft further having at least one cam member operably associated with said follower means of said gate.

8. The aggregate spreading apparatus according to claim 7, wherein said follower means further comprises:

(a) a follower arm pivotally coupled to said arm member, said follower arm having a roller member provided at one end thereof, said roller member being operably associated with said cam member; and (b) restriction means coupled to said arm member for restricting pivotal movement of said follower arm and transferring force from said cam member to said arm member.

9. The aggregate spreading apparatus according to claim 6, wherein said apparatus further comprises means for applying a positive pressure to said arm member.

10. The aggregate spreading apparatus according to claim 8, wherein said restriction means is a set screw.

11. The aggregate spreading apparatus according to claim 9, wherein said means for applying a positive pressure to said arm member is a pneumatic piston cylinder.

12. The aggregate spreading apparatus according to claim 1, wherein said control means further comprises a piston encoder.

13. The aggregate spreading apparatus according to claim 1, wherein said control means further comprises a rotary encoder.

14. The aggregate spreading apparatus according to claim 7, wherein said cam shaft further comprises a plurality of cam shaft members and attachment means for removably coupling adjacent cam shaft members.

15. The aggregate spreading apparatus according to claim 14, wherein said attachment means further comprises a female connector and a corresponding male connector.

16. The aggregate spreading apparatus according to claim 1, further comprising vibrating means for vibrating said hopper to facilitate uniform dispensing of said aggregate material.

17. The aggregate spreading apparatus according to claim 6, wherein said vibrating means further comprises an oscillating member operably connected to said hopper.

18. The aggregate spreading apparatus according to claim 1, wherein said control means further comprises speed sensors for sensing the velocity of the vehicle, a central processing unit for receiving input from said speed sensors, receiving aggregate dispensing data input from an operator, calculating a gate opening from speed data received from said speed sensors and said aggregate data, and relaying said calculated gate opening to said drive means to control said gate opening.

19. The aggregate spreading apparatus according to claim 1, wherein said hopper further comprises self-leveling means for maintaining said lower opening substantially perpendicular to an ambient gravitational vector.

20. The aggregate spreading apparatus according to claim 19, wherein said self-leveling means further comprises a level sensor operably connected to said hopper, an encoder operably coupled to said level sensor and adjustment means for receiving input from said encoder and leveling said hopper relative to said gravitational vector.

* * * * *